United States Patent
Tomoda et al.

(10) Patent No.: US 6,598,852 B2
(45) Date of Patent: Jul. 29, 2003

(54) SOLENOID VALVE

(75) Inventors: Shinichiro Tomoda, Miyagi (JP); Akira Nagasaki, Miyagi (JP); Masayuki Shibata, Miyagi (JP); Shigeto Ryuen, Miyagi (JP); Noboru Hino, Miyagi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/032,139

(22) Filed: Dec. 31, 2001

(65) Prior Publication Data

US 2002/0145125 A1 Oct. 10, 2002

(30) Foreign Application Priority Data

Apr. 6, 2001 (JP) .................................. 2001-109168
Apr. 6, 2001 (JP) .................................. 2001-109169
Apr. 6, 2001 (JP) .................................. 2001-109170
Apr. 6, 2001 (JP) .................................. 2001-109171

(51) Int. Cl.$^7$ ............................................. F16K 31/06
(52) U.S. Cl. ............................. 251/129.19; 251/129.14
(58) Field of Search ..................... 251/129.09, 129.1, 251/129.15–129.22

(56) References Cited

U.S. PATENT DOCUMENTS 5,108,071 A * 4/1992 Hutchings ............... 251/129.08
5,752,689 A * 5/1998 Barkhimer et al. ..... 251/129.15
5,984,259 A * 11/1999 Najmolhoda et al. .. 251/129.08
5,996,628 A * 12/1999 Najmolhoda et al. .. 251/129.08
6,223,761 B1 * 5/2001 Najmolhoda et al. .. 251/129.17

FOREIGN PATENT DOCUMENTS

JP          3-157576         7/1991

* cited by examiner

Primary Examiner—Paul J. Hirsch
(74) Attorney, Agent, or Firm—Arent Fox Kintner Plotkin & Kahn, PLLC (57) ABSTRACT

A solenoid valve includes a coil assembly accommodated in a solenoid housing having an end wall at one end thereof. A stationary core is magnetically coupled to the end wall and inserted into one end of a center bore, and a movable core opposed to the stationary core is inserted into the other end of the center bore. A yoke plate opposed to the other end of the coil assembly is coupled to the other end of the solenoid housing, and a collar made of a non-magnetic material adapted to guide the axial movement of the movable core is inserted into the other end of the center bore through a central portion of the yoke plate. A rod operatively connected to the movable core is connected to a valve member accommodated in a valve housing connected to the solenoid housing. In such solenoid valve, in order to facilitate the processing and assembling of the collar, the movable core and the rod and to provide a reduction in cost, the valve housing is provided with a guide for guiding the axial movement of the rod, and one end of the rod is put into coaxial abutment against the other end of the movable core.

29 Claims, 6 Drawing Sheets

SOLENOID VALVE

BACKGROUND OF THE INVENTION

1. Field of the Invention

The present invention relates to a solenoid valve, and particularly to an improvement in a solenoid valve including a coil assembly accommodated in a solenoid housing made of a magnetic metal and having an end wall at one end thereof, a movable core which is opposed to a stationary core magnetically connected to the end wall and inserted into one end of a center bore and which is inserted into the other end of the center bore, a yoke plate made of a magnetic metal which is opposed to the other end of the coil assembly and coupled to the other end of the solenoid housing, a collar made of a non-magnetic material which is adapted to guide the axial movement of the movable core and inserted into the other end of the center bore through the central portion of the yoke plate, a valve member accommodated in a valve housing connected to the solenoid housing, and a rod operatively connected to the movable core and connected to the valve member.

2. Description of the Related Art

Such a solenoid valve is conventionally well-known, for example, from Japanese Patent Application Laid-open No.3-157576 and the like. In this solenoid valve, one end of the rod is coaxially fitted in the movable core.

However, the conventionally known solenoid valve is of an arrangement such that the movable core and the rod are substantially integral with each other, and moreover the axial movement of only the movable core is guided. For this reason, the position of an axial center of the rod is influenced by the concentricity between the movable core and the rod and the accuracy of the position of the axial center of the collar adapted to guide the movable core. To ensure the smooth axial movements of the movable core and the rod within the collar and the valve housing, the processing accuracy and assembling accuracy of the collar adapted to guide the movable core, the movable core and the rod must be increased, thereby bringing about an increase in cost.

SUMMARY OF THE INVENTION

Accordingly, it is an object of the present invention to provide a solenoid valve, wherein the processing and assembling of the collar, the movable core and the rod can be facilitated to provide a reduction in cost.

To achieve the above object, according to a first aspect and feature of the present invention, there is provided a solenoid valve comprising a coil assembly including a bobbin made of a synthetic resin and having a center bore, and a coil wound around the bobbin, the coil assembly being accommodated in a solenoid housing made of a magnetic metal and having an end wall at one end thereof; a stationary core magnetically coupled to the end wall and inserted into one end of the center bore; a movable core opposed to the stationary core and inserted into the other end of the center bore; a yoke plate made of a magnetic metal, which has a through-bore in its central portion and which is opposed to the other end of the coil assembly and coupled to the other end of the solenoid housing; a collar made of a non-magnetic material adapted to guide the axial movement of the movable core and inserted into the other end of the center bore through the through-bore; and a valve member which is accommodated in a valve housing connected to the yoke plate and to which a rod operatively connected to the movable core is connected, wherein the valve housing is provided with a guide portion for guiding the axial movement of the rod, and one end of the rod is put into coaxial abutment against the other end of the movable core.

With such arrangement of the first feature, the movable core and the rod are separate from each other and hence, it is unnecessary to increase the processing accuracy for assembling the movable core and the rod to each other, and even if the axial centers of the movable core and the rod are offset slightly from each other, an adverse influence cannot be exerted to the axial movement of the movable core and the rod separately guided by the collar and the guide. Therefore, it is possible to facilitate the processing and assembling of the collar, the movable core and the rod, thereby providing a reduction in cost.

According to a second aspect and feature of the present invention, in addition to the arrangement of the first feature, the valve housing made of a synthetic resin is integrally connected to the bobbin through a plurality of connecting bores provided in the yoke plate. With such arrangement, the bobbin, the yoke plate and the valve housing are integrally connected to one another and hence, the accuracy of the axial centers of the bobbin, the yoke plate and the valve housing can be enhanced easily.

According to a third aspect and feature of the present invention, in addition to the arrangement of the second feature, an outer periphery of the yoke plate integrally coupled by molding between the valve housing and the bobbin is coupled to the solenoid housing on the side opposite from the end wall. With such arrangement, the assembling can be facilitated by integrally coupling the yoke plate upon the formation of the bobbin and the valve housing connected to each other through the connecting bores in the yoke plate.

According to a fourth aspect and feature of the present invention, in addition to the arrangement of the first feature, the collar which has at one end thereof an outward-facing collar portion protruding radially outwards and opposed to an inner surface of the center bore is press-fitted into the through-bore. With such arrangement, the collar is press-fitted into the through-bore using the outward-facing collar portion exerting no influence to the sliding movement of the movable core within the collar. Thus, it is possible to press-fit the collar having a thickness at a small valve to the utmost into the through-bore, whereby the distance between the movable core and the yoke plate can be set at a small value to the utmost to enhance the magnetic characteristic, and the axial movement of the movable core can be guided by the collar fixed to the yoke plate.

According to a fifth aspect and feature of the present invention, in addition to the arrangement of the fourth feature, the collar is provided at the other end thereof with an inward-facing collar portion protruding radially outwards, and one end of the rod through which the inward-facing collar portion is axially movably passed is put into coaxial abutment against the other end of the movable core within the collar. With such arrangement, the other end of the collar is substantially occluded by the rod and hence, it is possible to prevent the entrance of dust into the collar to the utmost.

According to a sixth aspect and feature of the present invention, in addition to the arrangement of the first feature, the yoke plate has a cylindrical portion integrally provided at a center thereof to protrude on the side opposite from the coil assembly and to define a portion of the through-bore. With such arrangement, the collar is supported over an axially relatively long distance by the cylindrical portion integral with the yoke plate and in this manner, the axis of the collar can be prevented to the utmost from being inclined. In addition, it is possible to increase the area of a portion of the yoke plate opposed to an outer surface of the movable core through the collar, and to provide an enhancement in magnetic characteristic by an increase in area of a magnetic path.

According to a seventh aspect and feature of the present invention, in addition to the arrangement of the first or sixth feature, the movable core is integrally provided with a smaller-diameter portion inserted into the collar, and a larger-diameter portion formed to have a diameter larger than that of the smaller-diameter portion and coaxially connected to one end of the smaller-diameter portion at a location outside axially one end of the collar in such a manner that it is opposed to the other end of the stationary core. With such arrangement, despite the insertion of the collar into the center bore in the bobbin, the area of opposition of the movable and stationary cores to each other can be set at a relatively large value, and the magnetic characteristic can be enhanced. Moreover, by cooperation with the increase in area of the magnetic path according to the arrangement of the sixth feature, the magnetic characteristic can be further enhanced.

According to an eighth aspect and feature of the present invention, in addition to the arrangement of the seventh feature, the movable core has a recess coaxially provided at one end thereof, so that a portion of a return spring mounted between the movable and stationary cores is accommodated in the recess. With such arrangement, despite the provision of the larger-diameter portion at one end of the movable core, the movable core can be lightened in weight, and the rapid axial movement of the movable core is possible.

According to a ninth aspect and feature of the present invention, in addition to the arrangement of the seventh feature, the larger-diameter portion has a groove provided in its outer surface to extend over the axially entire length of the larger-diameter portion to define a flow path between the outer surface of the larger-diameter portion and the inner surface of the center bore. With such arrangement, a fluid can be allowed to flow between opposite ends of the larger-diameter portion with the axial movement of the movable core, thereby contributing to the rapid axial movement of the movable core.

According to a tenth aspect and feature of the present invention, in addition to the arrangement of the ninth feature, the movable core has a recess coaxially provided at one end thereof, so that a portion of a return spring mounted between the movable and stationary cores is accommodated in the recess, and a communication bore provided at one end thereof to connect the flow path and the recess to each other. With such arrangement, the movement of the fluid with the axial movement of the movable core can be smoothened, whereby the movable core can be moved more quickly.

According to an eleventh aspect and feature of the present invention, in addition to the arrangement of the first feature, the rod is formed at one end thereof with an abutment face spherical about a phantom center on the axis of the rod, the abutment face abutting against the other end of the movable core. With such arrangement, even if a force from the movable core in a direction offset from the axis thereof is exerted to the rod, an influence cannot be exerted to the axial movement of the rod.

According to a twelfth aspect and feature of the present invention, in addition to the arrangement of the first feature, the bobbin has an accommodating recess provided at one end thereof to open in an opposed relation to the end wall of the solenoid housing, and a spring made of a conductive metal and adapted to exhibit a spring force for biasing the coil assembly toward the yoke plate is mounted between the end wall and an earth plate accommodated in the accommodating recess and leading to the coil. With such arrangement, the earth plate can be electrically connected to the solenoid housing, using the spring for supporting the coil assembly stably within the solenoid housing, whereby the solenoid housing can be grounded. Thus, it is unnecessary to mount a terminal member for the earth plate and hence, the number of parts can be reduced.

According to a thirteenth aspect and feature of the present invention, in addition to the arrangement of the first feature, a connecting shaft portion tightly passed through a through-bore provided in the end wall is integrally connected to the bobbin, and a coupler support plate is integrally formed on a couple made of a synthetic resin to which a terminal member connected to the coil faces, so that the coupler support plate abuts against the outer surface of the end wall, the coupler support plate and the connecting shaft portion inserted through a welding bore provided in the coupler support plate being welded to each other.

With such arrangement of the thirteenth feature, the coupler separate from the coil assembly can be mounted to the outer surface of the end wall of the housing and hence, despite the change in shape of the coupler, it is unnecessary to change the portions excluding the coupler, leading to enhanced general-purpose properties. Moreover, the connecting shaft portion is tightly passed through the through-bore provided in the end wall of the housing and hence, the position of the bobbin, i.e., the coil assembly relative to the solenoid housing within a plane perpendicular to the axis of the solenoid housing can be determined constant. In addition, by the fitting of the terminal member into the coupler, the position of the coupler relative to the coil assembly within the plane perpendicular to the axis of the solenoid housing can be determined constant, and thus, the coupler can be fixed firmly and stably to an outer surface of an end portion of the solenoid housing having a rigidity.

According to a fourteenth aspect and feature of the present invention, in addition to the arrangement of the thirteenth feature, the coupler support plate is formed integrally with the coupler separate from the coil assembly, and the terminal member passed through a terminal-penetration bore provided in the end wall is fitted into the coupler. With such arrangement, the coupler separate from the coil assembly can be mounted to the outer surface of the end wall of the solenoid housing and hence, despite the change in shape of the coupler, it is unnecessary to change the portions excluding the coupler, leading to enhanced general-purpose properties.

According to a fifteenth aspect and feature of the present invention, in addition to the arrangement of the thirteenth or fourteenth feature, at least two sets of the welding bores and the connecting shaft portions are disposed at locations where the coupler is interposed between them. With such arrangement, it is possible to reliably ensure the mounting and fixing of the coupler to the outer surface of the end wall of the solenoid housing.

According to a sixteenth aspect and feature of the present invention, in addition to the arrangement of the thirteenth or fourteenth feature, the coupler support plate is formed into a disk shape. With such arrangement, the load strength of the coupler over the entire periphery of the solenoid housing can be increased.

According to a seventeenth aspect and feature of the present invention, in addition to the arrangement of the thirteenth or fourteenth feature, a protrusion of the connecting shaft portion from the welding bore is pushed and crushed axially and thermally welded to the coupler support plate. With such arrangement, to weld the connecting shaft portion and the coupler support plate to each other, expensive welding equipment and welding jig for a ultrasonic welding and the like are not required, and inexpensive equipment and jig can be employed.

According to an eighteenth aspect and feature of the present invention, in addition to the arrangement of the seventeenth feature, the welding bore is provided, at its end opposite from the end wall, with a tapered portion with its diameter being larger at a location farther from the end wall. With such arrangement, the weld strength in a direction perpendicular to the axial directions of the welding bore can be increased.

According to a nineteenth aspect and feature of the present invention, in addition to the arrangement of the thirteenth feature, a base portion of the terminal member adjacent the bobbin is covered with a covering portion made of a synthetic resin formed integrally with the bobbin and fitted into the terminal-penetration bore. With such arrangement, a guide portion can be utilized for positioning of the bobbin and the coupler relative to the solenoid housing, while providing the insulation between the terminal member and the solenoid housing. Thus, in cooperation with the extension of the connecting shaft portion through the through-bore in the solenoid housing, the positioning of the bobbin and the coupler relative to the solenoid housing can be ensured more firmly.

According to a twentieth aspect and feature of the present invention, in addition to the arrangement of the first feature, the valve housing includes a guide bore coaxially communicating at one end thereof with the through-bore; a partition wall having a first valve bore through which the other end of the rod coaxially disposed in the guide bore is loosely inserted, and a first valve seat, to a central portion of which the first valve bore faces on the side opposite from the guide bore; and a fitting bore which is disposed coaxially with the guide bore with the partition wall disposed between the fitting bore and the other end of the guide bore and which has a step facing on the side opposite from the partition wall; and a valve seat member having a second valve seat at one end and provided at the other end with a limiting collar portion protruding radially outwards is fitted and fixed in the fitting bore in such a manner that a valve chest is provided between the valve seat member and the partition wall and the limiting collar portion abuts against the step. With such arrangement, in a state in which the valve seat member has been fitted and fixed in the valve housing, the second valve seat and the step of the valve housing are disposed at axially displaced locations. Thus, the determination of the position of the second valve seat corresponding to the diversification of the length and the shape of the valve housing can be achieved by only changing the length between the second valve seat and the limiting collar portion, leading to enhanced general-purpose properties.

According to a twenty-first aspect and feature of the present invention, in addition to the arrangement of the twentieth feature, the valve seat member has a second valve bore provided therein over the axially entire length with one end opening into a central portion of the second valve seat, and a filter is disposed to face the other end of the second valve bore with the limiting collar portion of the valve seat member interposed between an outer periphery of the filter and the step, the other end of the valve housing being engaged with the outer periphery of the filter by caulking. With such arrangement, it is possible to facilitate the assembling of the valve seat member and the filter to the valve housing.

According to a twenty-second aspect and feature of the present invention, in addition to the arrangement of the first feature, a valve seat member is fitted and fixed in the valve housing to define a valve chest between the valve seat member and the valve housing, and the spherical valve member is accommodated in the valve chest, so that it can be seated on a valve seat provided on the valve seat member, the valve seat member having the valve seat at one end being provided at the other end thereof with a limiting collar portion protruding radially outwards, the valve housing being provided with a step adapted to abut against the limiting collar portion upon fitting of the valve seat member to define an end of movement of the valve seat member in a fitting direction. With such arrangement, in a state in which the valve seat member has been fitted and fixed in the valve housing, the valve seat and the step of the valve housing are disposed at axially displaced locations. Thus, the determination of the position of the valve seat corresponding to the diversification of the length and the shape of the valve housing can be achieved by only changing the length between the second valve seat and the limiting collar portion, leading to enhanced general-purpose properties.

According to a twenty-third aspect and feature of the present invention, in addition to the arrangement of the twenty-second feature, the valve seat is formed into a tapered shape. With such arrangement, the seatability of the spherical valve member on the valve seat can be enhanced, and a stable seated state of the valve member can be maintained when the valve member is in its closed state.

According to a twenty-fourth aspect and feature of the present invention, in addition to the arrangement of the twenty-second feature, the valve housing is provided with a fitting bore coaxial with an axis of the movable core, and an O-ring is mounted to an outer periphery of the valve seat member fitted in the fitting bore with the limiting collar portion abutting against the annular step formed on an inner surface of the fitting bore, so that the O-ring comes into repulsive contact with the inner surface of the fitting bore. With such arrangement, the valve seat member can be fitted into the valve housing, while maintaining the sealability between the valve chest and the outside.

According to a twenty-fifth aspect and feature of the present invention, in addition to the arrangement of the twenty-second feature, valve member guide members are integrally connected to one end of the valve seat member to come into contact with the valve member at a plurality of points around an axis of the valve seat member to guide the movement of the valve member. With such arrangement, the valve member can be guided with a good accuracy to the valve seat.

According to a twenty-sixth aspect and feature of the present invention, in addition to the arrangement of the twenty-second feature, the valve seat member is formed of a synthetic resin. With such arrangement, it is possible to easily produce the valve seat member, thereby providing a reduction in cost.

According to a twenty-seventh aspect and feature of the present invention, in addition to the arrangement of the twenty-second feature, the valve seat member is formed of a metal. With such arrangement, the accuracy of formation of the valve seat can be enhanced to improve the seatability.

According to a twenty-eighth aspect and feature of the present invention, in addition to the arrangement of the twenty-fourth feature, the valve seat member has a valve bore provided therein over the axially entire length with one end opening into a central portion of the valve seat, and a filter is disposed to face the other end of the valve bore with the limiting collar portion of the valve seat member being interposed between an outer periphery of the filter and the step, the valve housing being engaged with the outer periphery of the filter by caulking. With such arrangement, it is possible to facilitate the assembling of the valve seat member and the filter to the valve housing.

According to a twenty-ninth aspect and feature of the present invention, in addition to the arrangement of the twenty-eighth feature, the filter comprises a net-shaped member supported on an inner periphery of a frame member formed into a ring shape, and the valve bore has a tapered bore portion coaxially provided at the other end thereof with the diameter of its larger-diameter end being larger at a location closer to the filter, while corresponding to the inner diameter of the frame member. With such arrangement, a fluid can be allowed to flow through the substantially entire net-shaped member of the filter, whereby the resistance to the flowing of the fluid can be suppressed.

The above and other objects, features and advantages of the invention will become apparent from the following description of the preferred embodiments taken in conjunction with the accompanying drawings.

BRIEF DESCRIPTION OF THE DRAWINGS

FIGS. 1 to 4 show a first embodiment of the present invention, wherein

FIGS. 5 and 6 shown a second embodiment of the present invention, wherein

DESCRIPTION OF THE PREFERRED EMBODIMENTS

Figure 1:
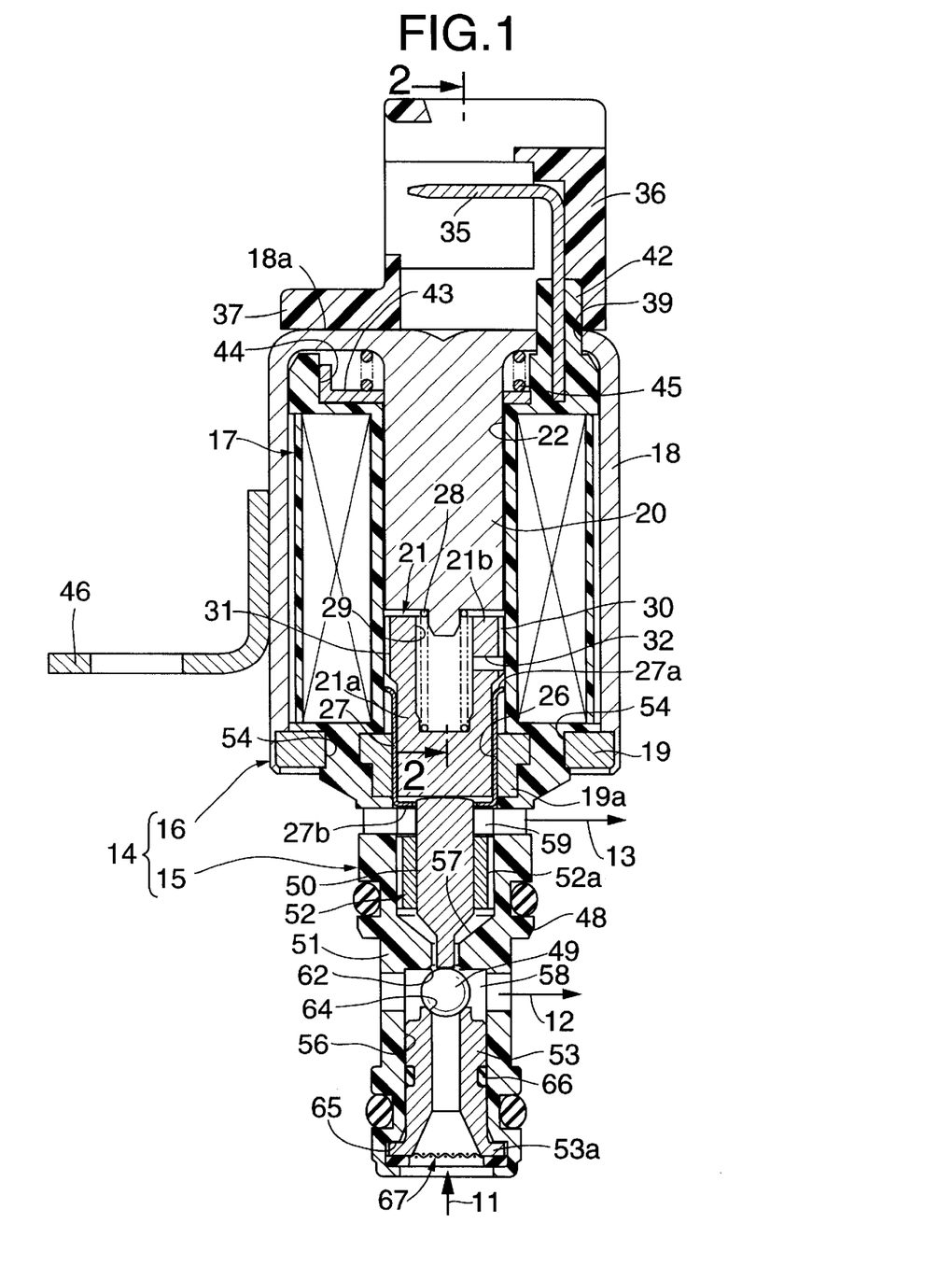
FIG. 1 is a vertical sectional view of a three-way solenoid valve.

A first embodiment of the present invention will now be described with reference to FIGS. 1 to 4. Referring first to FIG. 1, a three-way solenoid valve 14 is comprised of a valve section 15 operated to be switched over between a state in which it permits an inlet passage 11 leading to a fluid supply source (not shown) to communicate with an outlet passage 12 leading to a fluid-pressure actuator (not shown) and cuts off the communication between a discharge passage 13 leading to a reservoir (not shown) and the outlet passage 12 and a state in which it cuts off the communication between the inlet passage 11 and the outlet passage 12 and permits the discharge passage 13 and the outlet passage 12 to communicate with each other, and a solenoid section 16 adapted to exhibit an electromagnetic force for switching over the valve section 15.

Figure 2:
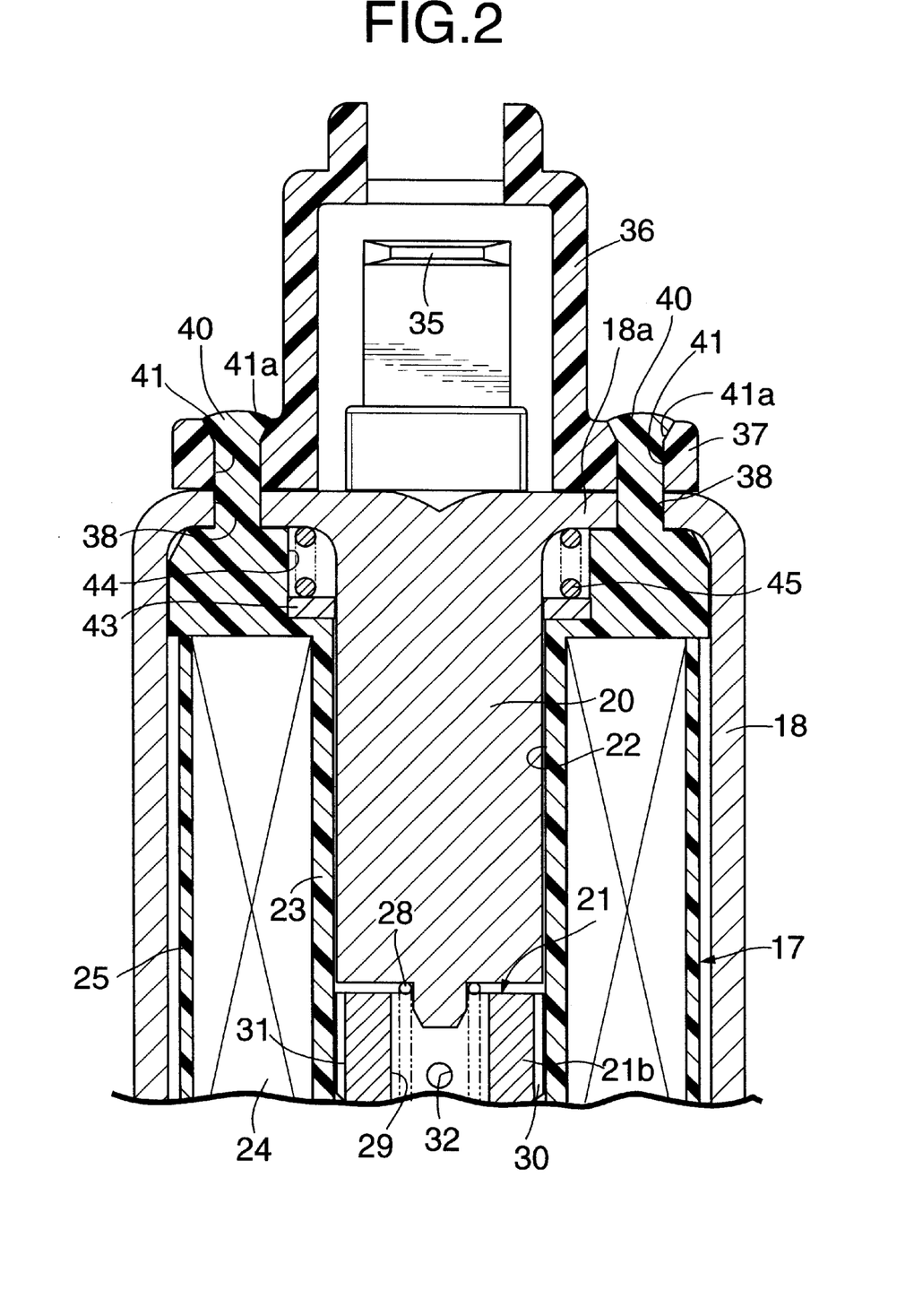
FIG. 2 is an enlarged sectional view taken along a line 2—2 in FIG. 1.
Figure 3:
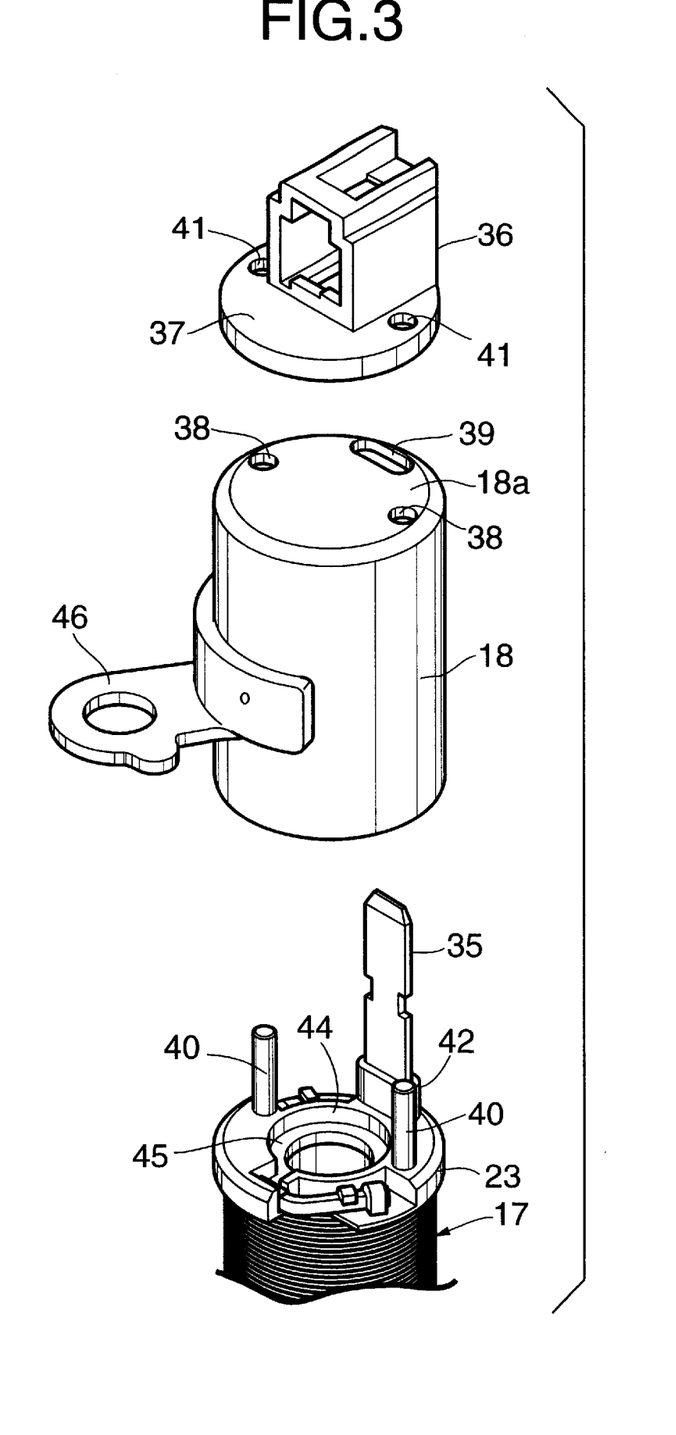
FIG. 3 is an exploded perspective view of a solenoid section.

Referring also to FIGS. 2 and 3, the solenoid section 16 includes a coil assembly 17, a solenoid housing 18 which is made of a magnetic metal and in which the coil assembly 17 is accommodated, a yoke plate 19 made of a magnetic metal and coupled to the solenoid housing 18, a stationary core 20 integrally formed on the solenoid housing 18, and a movable core 21 opposed to the stationary core 20.

The coil assembly 17 is comprised of a bobbin 23 made of a synthetic resin and having a central bore 22, a coil 24 wound around the bobbin 23, and a covering portion 25. The covering portion 25 is formed, for example, by winding a tape made of a synthetic resin around the coil 24 wound around the bobbin 23.

The solenoid housing 18 is formed into a bottomed cylindrical shape with an end wall 18a integrally provided at one end thereof and opposed to axially one end of the coil assembly 17. The stationary core 20 formed into a rod-shape and inserted from the side of one end into the central bore 22 is connected at its one end, for example, integrally to a central portion of the end wall 18a of the solenoid housing 18, whereby the stationary core 20 is magnetically coupled to the solenoid housing 18.

The yoke plate 19 has a through-bore 26 corresponding to the central bore 22 at its central portion, and is opposed to the other end of the coil assembly 17 with its outer periphery coupled to the other end of the solenoid housing 18 by caulking or by another means. Moreover, the yoke plate 19 is integrally provided at its center with a cylindrical portion 19a defining a portion of the through-bore 26 and protruding on the side opposite from the coil assembly 17.

The axial movement of the movable core 21 is guided by a cylindrical collar 27 made of a non-magnetic material, e.g., a stainless steel. The collar 27 is press-fitted into and through the through-bore 26 and inserted into the other end of the central bore 22. The collar 27 is provided at one end thereof with an outward-facing collar portion 27a protruding radially outwards and opposed to an inner surface of the central bore 22, and at the other end thereof with an inward-facing collar portion 27b protruding radially inwards.

On the other hand, the movable core 21 is integrally provided with a smaller-diameter portion 21a inserted into the collar 27, and a larger-diameter portion 21b formed to have a diameter larger than that of the smaller-diameter portion 21a and opposed to the other end of the stationary core 20. The larger-diameter portion 21b is coaxially connected to one end of the smaller-diameter portion 21a at a location outside the axially one end of the collar 27, and the movable core 21 has a recess 29 coaxially provided at one end thereof for accommodating a portion of a return spring 28 mounted between the movable core 21 and the stationary core 20.

For example a plurality of grooves 31 are provided in an outer surface of the larger-diameter portion 21b to extend over the axially entire length of the larger-diameter portion 21b to define a flow path 30 between the outer surface of the larger-diameter portion 21b and the inner surface of the central bore 22, and a communication bore 32 is provided in the movable core 21 to connect the flow path 30 and the recess 29 to each other.

A coupler 36 made of a synthetic resin is disposed outside the solenoid housing 18, and a terminal member 35 extended from the bobbin 23 and leading to one end of the coil 24 included in the coil assembly 17 faces the inside of the coupler 36. The coupler 36 is formed integrally with a disk-shaped coupler support plate 37 put into abutment against an outer surface of the end wall 18*a* of the solenoid housing 18.

A pair of through-bore 38, 38 and a terminal-penetration bore 39 are provided in the end wall 18*a* of the solenoid housing 18, and for example a pair of connecting shaft portions 20, 20 extending through the through-bores 38, 38 are integrally connected at one ends thereof to the bobbin 23. On the other hand, a pair of welding bores 41, 41 corresponding to the through-bores 38, 38 are provided in the coupler support plate 37, and tapered portions 41*a*, 41*a* having the diameter larger at a location farther from the end wall 18 are provided at ends of the welding bores 41, 41 opposite from the end wall 18*a*.

The connecting shaft portions 40, 40 are inserted through the welding bores 41, 41, respectively, and the other ends of the connecting shaft portions 40, 40 and the coupler support plate 37 are thermally welded to each other in such a manner that portions of the connecting shaft portions 40, 40 protruding from the welding bores 41, 41 are pressed and crushed axially.

Moreover, two sets of the welding bores 41, 41 and the connecting shaft portions 40, 40 are disposed at locations where the coupler 36 is sandwiched between them.

A base portion of the terminal member 35 on the bobbin 23 side is covered with a covering portion 42 of a synthetic resin formed integrally with the bobbin 23 and fitted into the terminal-penetration bore 39, and the terminal member 35 is bent into a substantially L-shape and fitted to the coupler 36.

A ring-shaped earth plate 43 connected to the other end of the coil 23 included in the coil assembly 17 is accommodated in an accommodating recess 44 provided in an outer surface of one end of the bobbin 23, and a spring 45 is mounted between the earth plate 43 and the end wall 18*a* for urging the coil assembly 17 toward the yoke plate 19 to maintain the position of the coil assembly 17 constant within the solenoid housing 18. Moreover, the spring 45 is formed of a conductive metal, and the earth plate 43 is electrically connected to the solenoid housing 18 through the spring 45. Further, a bracket 46 for supporting a support member made of a metal (not shown) is welded to the solenoid housing 18, and the other end of the coil 24 is grounded through the earth plate 43, the spring 45, the solenoid housing 18, the bracket 46 and the support member.

Figure 4:
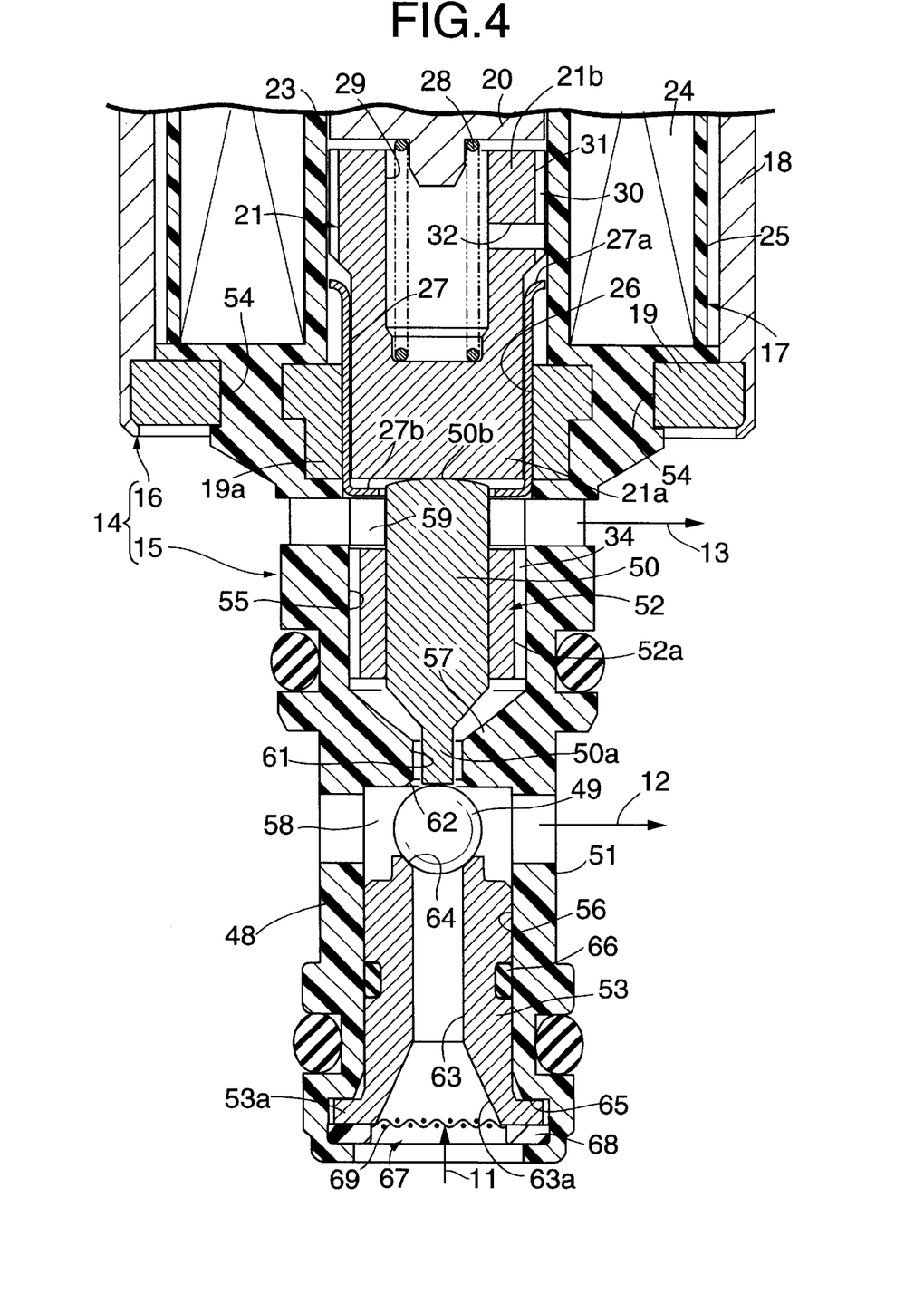
FIG. 4 is an enlarged view of a lower portion of the solenoid valve shown in FIG. 2.

Referring also to FIG. 4, the valve section 15 includes a valve housing 48 made of a synthetic resin, a spherical valve member 49 accommodated in the valve housing 48, and a rod 50 which operatively connects the movable core 21 of the solenoid section 16 and the spherical valve member 49 to each other.

The valve housing 48 is integrally connected at one end thereof to the bobbin 23 of the coil assembly 17 in the solenoid section 16. More specifically, a plurality of connecting bores 54 are provided in the yoke plate 19, and the valve housing 48 integrally leading to the bobbin 23 through the connecting bores 54, the bobbin 23 and the yoke plate 19 sandwiched between the valve housing 48 and the bobbin 23 are integrally coupled to one another by molding.

The valve housing 48 includes a guide bore 55 coaxially communicating at one end thereof with the through-bore 26 in the yoke plate 19 included in the solenoid section 15, a partition wall 57 having a first valve bore 61 coaxial with the guide bore 55 and a first valve seat 62, to a central portion of which the first valve bore 61 faces at the side opposite from the guide bore 55, and a fitting bore 56 which is disposed coaxially with the guide bore 55 with the partition wall 57 disposed between the fitting bore 56 and the other end of the guide bore 55 and which has a step 65 formed on its inner surface at an end opposite from the partition wall 57 to face on the side opposite from the partition wall 57.

The rod 50 is disposed coaxially in the guide bore 55 and is provided at the other end with a smaller-diameter portion 50*a* loosely inserted through the first valve bore 61. A cylindrical member made of a metal and functioning as a guide 52 for guiding the axial movement of the rod 50 is press-fitted into the guide bore 55. For example a plurality of grooves 52*a* are provided in an outer periphery of the cylindrical member over the entire length to define a flow path 34 between the cylindrical member and the valve housing 48, and an open chamber 59 is defined in the valve housing 48 between the yoke plate 19 of the solenoid section 16 and the guide 52 to lead to the discharge passage 13.

The inward-facing collar portion 27*b* protruding radially inwards is integrally provided at the other end 27 in the solenoid section 16, and one end of the rod 50 axially movably passed through the inward-facing collar portion 27*b* is put into coaxial abutment against the other end of the movable core 21 within the collar 27. Moreover, a spherical abutment face 50*b* having a phantom center on an axis of the rod 50 is formed at one end of the rod 50 to abut against the other end of the movable core 21.

A valve seat member 53 having a second tapered valve seat 64 at one end thereof and a limiting collar portion 53*a* protruding radially outwards at the other end is fitted into the fitting bore 56 in such a manner than a valve chest 58 is defined between the valve seat member 53 and the partition wall 57 to communicate with the outlet passage 12, and the limiting collar portion 53*a* abuts against the step 64. An O-ring 66 is mounted to an outer periphery of the valve seat member 53 to come into repulsive contact with the inner surface of the fitting bore 56.

The spherical valve member 49 capable of being seated alternatively on the first and second valve seats 62 and 64 is accommodated in the valve chest 58, and the smaller-diameter portion 50*a* of the rod 50 loosely passed through the first valve bore 61 abuts against the spherical valve member 49.

A second valve bore 63 is provided in the valve seat member 53 over the axially entire length, and opens at one end thereof into the central portion of the second valve seat 64, and a filter 67 is disposed between the second valve bore 63 and the inlet passage 11 to face the other end of second valve bore 63 with a limiting collar portion 53*a* of the valve seat member 53 interposed between an outer periphery of the filter 67 and the step 65, and the other end of the valve housing 48 is engaged by caulking such as thermal caulking with the outer periphery of the filter 67. Thus, the valve seat member 53 fitted in the fitting bore 56 is fixed to the valve housing 48.

The filter 67 comprises a net-shaped member 69 supported on an inner periphery of a frame member 68 formed into a ring shape, and the second valve bore 63 has a tapered bore portion 63*a* coaxially provided at the other end thereof, with the diameter of a larger-diameter end of the tapered bore portion 63*a* being larger at a location closer to the filter 67, while corresponding to the inner diameter of the frame member 68.

The valve seat member 53 may be formed of a metal or a synthetic resin. When the valve seat member 53 is formed of a metal, the forming accuracy of the second valve seat 64 can be enhanced, leading to an improved seatability. When the valve seat member 53 is formed of a synthetic resin, the fabrication of the valve seat member 53 can be facilitated, leading to a reduction in cost.

The operation of the first embodiment will be described below. When electric current is supplied to the coil 24 of the solenoid section 16, the movable core 21 is attracted toward the stationary core 20 against a spring force of the return spring 28 and hence, in a state in which a fluid pressure has been applied from the inlet passage 11 through the filter 67 to the second valve bore 63, the spherical valve member 49 is pushed upwards away from the second valve seat 64 and seated on the first valve seat 62. Therefore, the second valve bore 63 is opened, and the first valve bore 61 is closed, thereby causing the inlet passage 11 to communicate with the outlet passage 12, and causing the outlet passage 12 and the discharge passage 13 to be put out of communication with each other.

On the other hand, when the supplying of electric current to the coil 24 of the coil section 16 is stopped, the movable core 21 is operated in a direction away from the stationary core 20 under the action of the spring force of the return spring 28, and hence, the spherical valve member 49 is urged by the rod 50, so that it is unseated from the first valve seat 62 and seated on the second valve seat 64. Therefore, the first valve 61 is opened, and the second valve bore 63 is closed, thereby causing the outlet passage 12 to communicate with the discharge passage 13, and causing the outlet passage 12 and the inlet passage 11 to be put out of communication with each other.

In the solenoid section 16 in such three-way solenoid valve 14, one end of each of the connecting shaft portions 40, 40 of the synthetic resin extending through the through-bores 38, 38 provided in the end wall 18a of the solenoid housing 18 is connected to the bobbin 23; the coupler support plate 37 formed integrally with the coupler 36 separate from the coil assembly 17 is welded to the other ends of the connecting shaft portions 40, 40 inserted through the welding bores 41, 41 in the coupler support plate 37, and the terminal member 35 extending through the terminal-penetration bore 39 in the end wall 18a is fitted in the coupler 36. Therefore, the coupler 36 separate from the coil assembly 17 can be mounted to the outer surface of the end wall 18a of the solenoid housing 18, and despite the change in shape of the coupler 36, it is unnecessary to change the portions excluding the coupler 36, thereby enhancing the general-purpose properties. Moreover, the connecting shaft portions 40, 40 and the bobbin 23 are formed integrally with each other and hence, it is possible to avoid an increase in number of parts and an increase in number of assembling steps due to the provision of the connecting shaft portions 40, 40.

When the coupler support plate 37 and the connecting shaft portions 40, 40 are welded to each other, the protrusions of the connecting shaft portions 40, 40 from the welding bores 41, 41 is pushed and crushed axially and thermally welded to the coupler support plate 37. Therefore, the coupler 37 and the connecting shaft portions 40, 40 can be welded to each other without need for expensive welding equipment and jig for a ultrasonic welding and the like and thus, inexpensive equipment and jig can be used for the thermal welding. In this case, the weld strength in a direction perpendicular to the axial directions of the welding bores 41, 41 can be increased, because the tapered portions 41a, 41a with the diameter increased in the direction away from the end wall 18a are provided at ends of the welding bores 41, 41 opposite from the end wall 18a.

Moreover, the connecting shaft portions 40, 40 extend through the through-bores 38, 38 provided in the end wall 18a of the solenoid housing 18 and hence, the position of the bobbin 23, i.e., the coil assembly relative to the solenoid housing 18 in a plane perpendicular to the axis of the solenoid housing 18 can be determined constant. In addition, the position of the coupler 36 relative to the coil assembly 17 in the plane perpendicular to the axis of the solenoid housing 18 can be determined constant by fitting of the terminal member 35 in the coupler 36, and the coupler 36 can be fixed firmly and stably to the outer surface of the end wall 18a of the solenoid housing 18 having a rigidity.

The welding bores 41, 41 and the connecting shaft portions 40, 40 forming two pairs with each other are disposed at locations where the coupler 36 is interposed between them and hence, it is possible to reliably achieve the mounting and fixing of the coupler 36 to the outer surface of the end wall 18a included in the solenoid housing 18. Since the coupler support plate 37 is formed into the disk shape, the load strength of the coupler 36 in the direction around the entire circumference of the solenoid housing 18 can be increased.

Additionally, the base portion of the terminal member 35 adjacent the bobbin 23 is covered with a covering portion 42 made of a synthetic resin, formed integrally with the bobbin 23 and fitted in the terminal-penetration bore 39. The guide portion 52 can be utilized for positioning of the bobbin 23 and the coupler 36 relative to the solenoid housing 18, while providing the insulation between the terminal member 35 and the solenoid housing 18. Thus, in cooperation with the extension of the connecting shaft portions 40, 40 through the through-bores 38, 38 in the solenoid housing 18, the positioning of the bobbin 23 and the coupler 36 relative to the solenoid housing 18 can be ensured more firmly.

Further, the collar 27 made of the non-magnetic material for guiding the axial movement of the movable core 21 is press-fitted in the through-bore 26 provided in the central portion of the yoke plate 19 to extend through the through-bore 26, and the outward-facing collar portion 27a protruding radially outwards and opposed to the inner surface of the center bore 22 in the bobbin 23 is integrally provided at one end of the collar 27. Therefore, it is possible to press-fit the collar 27 into the through-bore 26 in the yoke plate 19 using the outward-facing collar portion 27a exerting no influence to the sliding movement of the movable core 21 within the collar 27. In this manner, it is possible to achieve the press-fitting of the collar 27 having a thickness set at a small value to the utmost. As a result, the distance between the movable core 21 and the yoke plate 19 can be set at a small value to the utmost to enhance the magnetic characteristic, and the axial movement of the movable core 21 can be guided stably by the collar 27 fixed to the yoke plate 19.

The cylindrical portion 19a defining a portion of the through-bore 26 is integrally provided in the central portion of the yoke plate 19 to protrude on the side opposite from the coil assembly 17, and the collar 27 is supported over a axially relatively long distance by the cylindrical portion 19a integral with the yoke plate 19a. In this manner, the axis of the collar 27 can be prevented to the utmost from being inclined. In addition, the area of a portion of the yoke plate 19 opposed to the outer surface of the movable core 21 through the collar 27 can be increased, and an enhancement in magnetic characteristic can be provided by an increase in area of a magnetic path.

In addition, the movable core 21 is integrally provided with the smaller-diameter portion 21a inserted into the collar 27, and the larger-diameter portion 21b formed with the diameter larger than that of the smaller-diameter portion 21a and coaxially connected to one end of the smaller-diameter portion 21a at the location outside the axially one end of the collar in such a manner that it is opposed to the other end of the stationary core 20. Notwithstanding that the collar 27 is inserted into the center bore 22 in the bobbin, the area of opposition between the movable core 21 and the stationary core 20 is set at a relatively large value, and thus, the magnetic characteristic can be further enhanced in cooperation with the increase in area of the portion of the yoke plate 19 opposed to the outer surface of the movable core 21 through the collar 27.

The recess 29 for accommodation of a portion of the return sprig 28 mounted between the movable core 21 and the stationary core 20 is coaxially provided in one end of the movable core 21 and hence, the movable core 21 can be lightened in weight, despite the provision of the larger-diameter portion 21b at one end of the movable core 21, and the rapid axial movement of the movable core 21 is possible. The grooves 31 defining the flow path 30 between the grooves themselves and the inner surface of the center bore 22 are provided to extend over the axially entire length of the larger-diameter portion 21b and hence, the fluid can be moved between the opposite ends of the larger-diameter portion 21b with the axial movement of the movable core 21, thereby contributing to the rapid axial movement of the movable core 21. Further, since the communication bore 32 is provided in one end of the movable core 21 to connect the flow path 30 and the recess 29 to each other, the movement of the fluid caused with the movement of the axial movement of the movable core 21 can be smoothened, whereby the movable core 21 can be moved quickly.

The movable core 21 included in the solenoid section 16 and the rod 50 included in the valve section 15 are separated from each other in such a manner that one end of the rod 50 abuts against the other end of the movable core 21. Thus, it is unnecessary to increase the processing accuracy for the assembling of the movable core 21 and the rod 50, and even if the axial centers of the movable core 21 and the rod 50 are misaligned slightly from each other, an adverse influence cannot be exerted to the axial movements of the movable core 21 and the rod 50 separately guided by the collar 27 and the guide 52. Therefore, it is possible to facilitate the processing and assembling of the collar 27, the movable core 21 and the rod 50, thereby providing a reduction in cost.

The valve housing 48, the bobbin 23 and the yoke plate 19 are coupled integrally to one another by molding so that the valve housing 48 in the valve section 15 is integrally connected to the bobbin 23 through the plurality of connecting bores 54 provided in the yoke plate 19 in the solenoid section 16. Therefore, it is possible to easily increase the accuracy of the axial centers of the bobbin 23, the yoke plate 19 and the valve housing 48.

Moreover, the inward-facing collar portion 27b protruding the radially inwards is integrally provided at the other end of the collar 27, and one end of the rod 50 axially movably passed through the inward-facing collar portion 27b is disposed to coaxially abut against the other end of the movable core 21 within the collar 27. Therefore, the other end of the collar 27 is substantially occluded by the rod 50 and thus, it is possible to prevent the entrance of dust into the collar 27 to the utmost.

Further, the abutment face 50b spherical about the phantom center on the axis of the rod 50 is formed at one end of the rod 50 to abut against the other end of the movable core 21. Therefore, it is possible to ensure that even if a force from the movable core 21 in a direction offset from the axis thereof is exerted to the rod 50, an influence cannot be exerted to the axial movement of the rod 50.

The bobbin 23 is provided at one end thereof with the accommodating recess 44, which opens in an opposed relation to the end wall 18a of the solenoid housing 18, and the spring 45 made of the conductive metal for biasing the coil assembly 17 toward the yoke plate 19 is mounted between the earth plate 43 accommodated in the accommodating recess 44 to lead to the coil 24 and the end wall 18a. Thus, the earth plate 43 can be electrically connected to the solenoid housing 18 using the spring 45 for retaining the coil assembly 17 stably within the solenoid housing 18, and the solenoid housing 18 can be grounded. In this way, it is unnecessary to mount a grounding terminal member, leading to a reduction in number of parts.

To fit and fix the valve seat member 53 of the valve housing 48 in the valve section 15, the valve seat member 53 having the second valve seat 64 at one end is provided at the other end thereof with the limiting collar portion 53a protruding the radially outwards, and the valve housing 48 is provided with the step 65 adapted to abut against the limiting collar portion 53a upon the fitting of the valve seat member 53 to define the end of movement of the valve seat member 53 in a fitting direction. Therefore, in a state in which the valve seat member 53 has been fitted and fixed in the valve housing 48, the second valve seat 64 and the step 65 of the valve housing 48 are disposed in axially displaced positions. Thus, the determination of the position of the second valve seat 64 corresponding to the diversification of the length and the shape of the valve housing 48 can be achieved by only changing the length between the second valve seat 64 and the limiting collar portion 53a, leading to enhanced general-purpose properties.

The second valve seat 64 is formed into a tapered shape, which can improve the seatability of the spherical valve member 49 with respect to the second valve seat 64 and can maintain a stable seating state of the valve member 49 when the valve is closed.

To fit the valve seat member 53, the fitting bore 56 is provided in the other end of the valve housing 48 coaxially with the axis of the movable core 21 to open on the side opposite from the solenoid housing 18 of the solenoid section 16. The O-ring 66 is mounted on the outer periphery of the valve seat member 53 fitted in the fitting bore 56 with the limiting collar portion 53a abutting against the annular step 65 formed on the inner surface of the intermediate portion of the fitting bore 56, so that the O-ring 66 comes into repulsive contact with the inner surface of the fitting bore 56. Thus, the valve seat member 53 can be fitted in the valve housing 48, while maintaining the sealability between the valve chest 58 and the outside.

Further, the second valve bore 63 is provided in the valve seat member 53 over the axially entire length with one end opening into the central portion of the second valve seat 64; the outer periphery of the filter 67, to which the other end faces, is disposed with the limiting collar portion 53a of the valve seat member 53 interposed between the outer periphery of the filter 67 and the step 65, and the other end of the valve housing 48 is engaged with the outer periphery of the filter 67 by caulking. Therefore, it is possible to facilitate the assembling of the valve seat member 53 and the filter 67 to the valve housing 48.

The filter 67 comprises the net-shaped member 69 supported on the inner periphery of the frame member 68 formed into the ring shape, and the second valve bore 63 has the tapered bore portion 63a coaxially provided at the other end thereof, with the diameter of the larger-diameter end of the tapered bore portion 63a being larger at a location closer to the filter 67, while corresponding to the inner diameter of the frame member 68, so that the fluid flows through the substantial entirety of the net-shaped member 69 of the filter 67, whereby the resistance to the flowing of the fluid can be suppressed.

Figure 5:
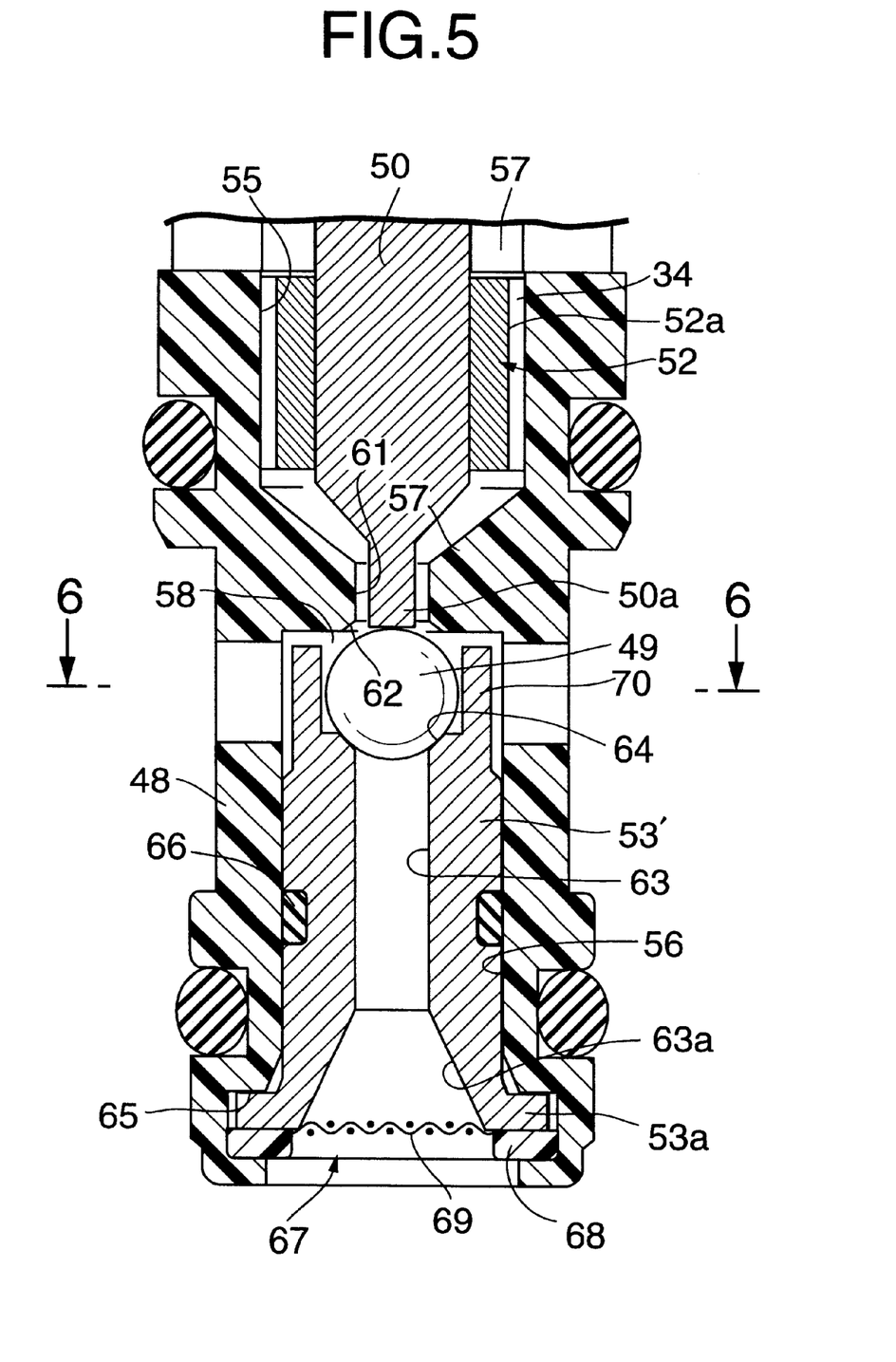
FIG. 5 is a vertical sectional view of a valve section corresponding to the FIG. 4.
Figure 6:
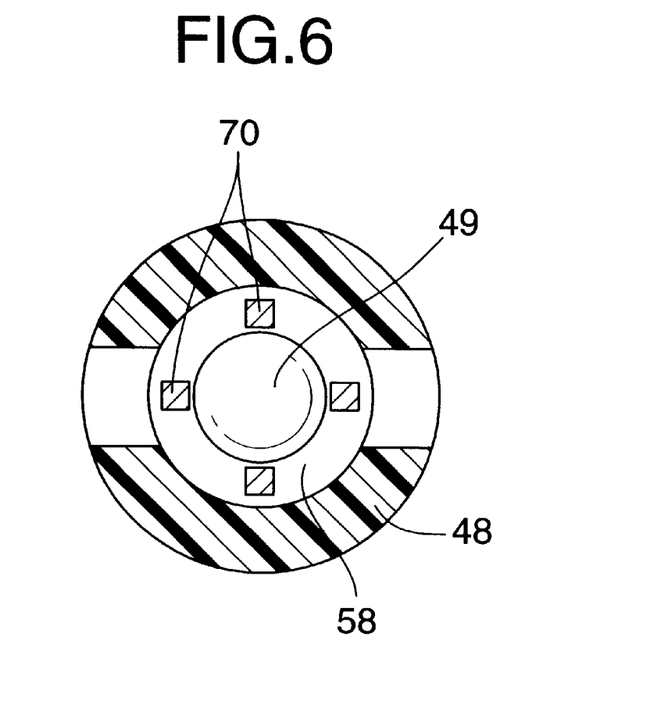
FIG. 6 is a sectional view taken along a line 6—6 in FIG. 5.

A second embodiment of the present invention will be described be low with reference to FIGS. 5 and 6. Spherical valve member guide members 70 are integrally connected to one end of a valve seat member 53' fitted and fixed in a valve housing 48 to come into contact, at a plurality of, e.g., four points around an axis of the valve seat member 53', with a spherical valve member 49 accommodated in a valve chest 58 to which one end of the valve seat member 53 faces.

According to the second embodiment, the spherical valve member 49 can be guided with a good accuracy to the first and second valve seats 62 and 64, in addition to the effect in the first embodiment.

Figure 7:
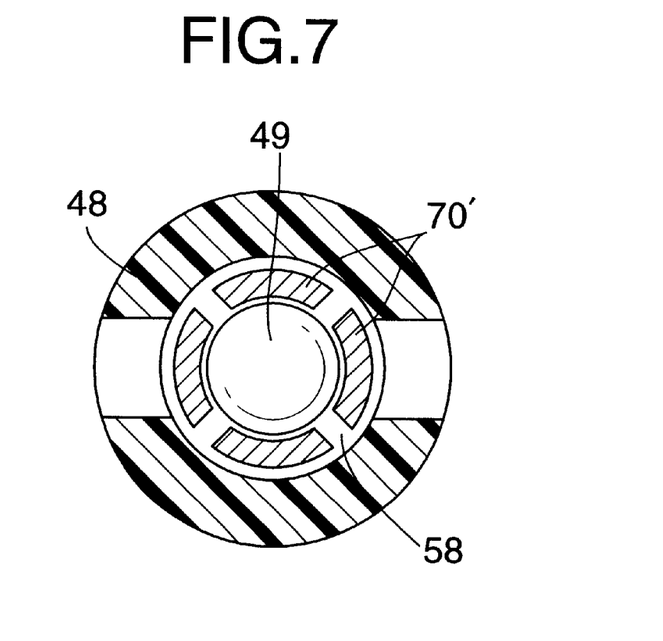
FIG. 7 is a view similar to FIG. 6, but showing a modification to the second embodiment.

FIG. 7 shows a modification to the second embodiment. In the modification, the length of the spherical valve member guide portions 70' in a circumferential direction of the valve seat member 53' may be set at a value larger than that of the spherical valve member guide portions 70 shown in FIG. 6.

Although the embodiments of the present invention have been described in detail, it will be understood that the present invention is not limited to the above-described embodiments, and various modifications in design may be made without departing from the spirit and scope of the invention defined in the claims.

What is claimed is:

1. A solenoid valve comprising a coil assembly including a bobbin made of a synthetic resin and having a center bore, and a coil wound around said bobbin, said coil assembly being accommodated in a solenoid housing made of a magnetic metal and having an end wall at one end thereof; a stationary core magnetically coupled to said end wall and inserted into one end of said center bore; a movable core opposed to said stationary core and inserted into the other end of said center bore; a yoke plate made of a magnetic metal, which has a through-bore in its central portion and which is opposed to the other end of said coil assembly and coupled to the other end of said solenoid housing; a collar made of a non-magnetic material adapted to guide the axial movement of said movable core and inserted into the other end of said center bore through said through-bore; and a valve member which is accommodated in a valve housing connected to said yoke plate and to which a rod operatively connected to said movable core is connected, wherein said valve housing is provided with a guide portion for guiding the axial movement of said rod, and one end of said rod is put into coaxial abutment against the other end of said movable core.

2. A solenoid valve according to claim 1, wherein said valve housing made of a synthetic resin is integrally connected to said bobbin through a plurality of connecting bores provided in said yoke plate.

3. A solenoid valve according to claim 2, wherein an outer periphery of said yoke plate integrally coupled by molding between said valve housing and said bobbin is coupled to said solenoid housing on the side opposite from said end wall.

4. A solenoid valve according to claim 1, wherein said collar which has at one end thereof an outward-facing collar portion protruding radially outwards and opposed to an inner surface of said center bore is press-fitted into said through-bore.

5. A solenoid valve according to claim 4, wherein said collar is provided at the other end thereof with an inward-facing collar portion protruding radially outwards, and one end of said rod through which said inward-facing collar portion is axially movably passed is put into coaxial abutment against the other end of said movable core within said collar.

6. A solenoid valve according to claim 1, wherein said yoke plate has a cylindrical portion integrally provided at a center thereof to protrude on the side opposite from said coil assembly and to define a portion of said through-bore.

7. A solenoid valve according to claim 1 or 6, wherein said movable core is integrally provided with a smaller-diameter portion inserted into said collar, and a larger-diameter portion formed to have a diameter larger than that of said smaller-diameter portion and coaxially connected to one end of said smaller-diameter portion at a location outside axially one end of said collar in such a manner that it is opposed to the other end of said stationary core.

8. A solenoid valve according to claim 7, wherein said movable core has a recess coaxially provided at one end thereof, so that a portion of a return spring mounted between said movable and stationary cores is accommodated in said recess.

9. A solenoid valve according to claim 7, wherein said larger-diameter portion has a groove provided in its outer surface to extend over the axially entire length of the larger-diameter portion to define a flow path between the outer surface of said larger-diameter portion and the inner surface of said center bore.

10. A solenoid valve according to claim 9, wherein said movable core has a recess coaxially provided at one end thereof, so that a portion of a return spring mounted between said movable and stationary cores is accommodated in said recess, and a communication bore provided at one end thereof to connect said flow path and said recess to each other.

11. A solenoid valve according to claim 1, wherein said rod is formed at one end thereof with an abutment face spherical about a phantom center on the axis of said rod, said abutment face abutting against the other end of said movable core.

12. A solenoid valve according to claim 1, wherein said bobbin has an accommodating recess provided at one end thereof to open in an opposed relation to said end wall of said solenoid housing, and a spring made of a conductive metal and adapted to exhibit a spring force for biasing said coil assembly toward said yoke plate is mounted between said end wall and an earth plate accommodated in said accommodating recess and leading to said coil.

13. A solenoid valve according to claim 1, wherein a connecting shaft portion tightly passed through a through-bore provided in said end wall is integrally connected to said bobbin, and a coupler support plate is integrally formed on a coupler made of a synthetic resin to which a terminal member connected to said coil faces, so that said coupler support plate abuts against the outer surface of said end wall, said coupler support plate and said connecting shaft portion inserted through a welding bore provided in said coupler support plate being welded to each other.

14. A solenoid valve according to claim 13, wherein said coupler support plate is formed integrally with said coupler separate from said coil assembly, and said terminal member passed through a terminal-penetration bore provided in said end wall is fitted into said coupler.

15. A solenoid valve according to claim 13 or 14, wherein at least two sets of said welding bores and said connecting shaft portions are disposed at locations where said coupler is interposed between them.

16. A solenoid valve according to claim 13 or 14, wherein said coupler support plate is formed into a disk shape.

17. A solenoid valve according to claim 13 or 14, wherein a protrusion of said connecting shaft portion from said welding bore is pushed and crushed axially and thermally welded to said coupler support plate.

18. A solenoid valve according to claim 17, wherein said welding bore is provided, at its end opposite from said end wall, with a tapered portion with its diameter being larger at a location farther from said end wall.

19. A solenoid valve according to claim 13, wherein a base portion of said terminal member adjacent said bobbin is covered with a covering portion made of a synthetic resin formed integrally with said bobbin and fitted into said terminal-penetration bore.

20. A solenoid valve according to claim 1, wherein said valve housing includes a guide bore coaxially communicating at one end thereof with said through-bore; a partition wall having a first valve bore through which the other end of said rod coaxially disposed in said guide bore is loosely inserted, and a first valve seat, to a central portion of which said first valve bore faces on the side opposite from said guide bore; and a fitting bore which is disposed coaxially with said guide bore with the partition wall disposed between said fitting bore and the other end of said guide bore and which has a step facing on the side opposite from said partition wall; and a valve seat member having a second valve seat at one end and provided at the other end with a limiting collar portion protruding radially outwards is fitted and fixed in said fitting bore in such a manner that a valve chest is provided between the valve seat member and the partition wall and said limiting collar portion abuts against said step.

21. A solenoid valve according to claim 20, wherein said valve seat member has a second valve bore provided therein over the axially entire length with one end opening into a central portion of said second valve seat, and a filter is disposed to face the other end of said second valve bore with said limiting collar portion of said valve seat member interposed between an outer periphery of said filter and said step, the other end of said valve housing being engaged with the outer periphery of said filter by caulking.

22. A solenoid valve according to claim 1, wherein a valve seat member is fitted and fixed in said valve housing to define a valve chest between said valve seat member and said valve housing, and said valve member is accommodated in said valve chest, so that it can be seated on a valve seat provided on said valve seat member, said valve seat member having said valve seat at one end being provided at the other end thereof with a limiting collar portion protruding radially outwards, said valve housing being provided with a step adapted to abut against said limiting collar portion upon fitting of said valve seat member to define an end of movement of said valve seat member in a fitting direction.

23. A solenoid valve according to claim 22, wherein said valve seat is formed into a tapered shape.

24. A solenoid valve according to claim 22, wherein said valve housing is provided with a fitting bore coaxial with an axis of said movable core, and an O-ring is mounted to an outer periphery of said valve seat member fitted in said fitting bore with said limiting collar portion abutting against said annular step formed on an inner surface of said fitting bore, so that said O-ring comes into repulsive contact with the inner surface of said fitting bore.

25. A solenoid valve according to claim 22, wherein valve member-guide members are integrally connected to one end of said valve seat member to come into contact with said valve member at a plurality of points around an axis of said valve seat member to guide the movement of said valve member.

26. A solenoid valve according to claim 22, wherein said valve seat member is formed of a synthetic resin.

27. A solenoid valve according to claim 22, wherein said valve seat member is formed of a metal.

28. A solenoid valve according to claim 24, wherein said valve seat member has a valve bore provided therein over the axially entire length with one end opening into a central portion of said valve seat, and a filter is disposed to face the other end of said valve bore with the limiting collar portion of said valve seat member being interposed between an outer periphery of said filter and said step, said valve housing being engaged with the outer periphery of said filter by caulking.

29. A solenoid valve according to claim 28, wherein said filter comprises a net-shaped member supported on an inner periphery of a frame member formed into a ring shape, and said valve bore has a tapered bore portion coaxially provided at the other end thereof with the diameter of its larger-diameter end being larger at a location closer to said filter, while corresponding to the inner diameter of said frame member.

* * * * *